(12) United States Patent
Hwang et al.

(10) Patent No.: US 9,080,058 B2
(45) Date of Patent: Jul. 14, 2015

(54) HARD COATING FILM, HARD COATING AGENT, AND POLARIZING PLATE INCLUDING THE HARD COATING FILM

(75) Inventors: Sung Chul Hwang, Uiwang-si (KR); Kyoung Ku Kang, Uiwang-si (KR); Byung Soo Kim, Uiwang-si (KR); Do Young Kim, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 13/535,407

(22) Filed: Jun. 28, 2012

(65) Prior Publication Data

US 2012/0270027 A1     Oct. 25, 2012

Related U.S. Application Data

(63) Continuation of application No. PCT/KR2010/009530, filed on Dec. 29, 2010.

(30) Foreign Application Priority Data

Dec. 31, 2009  (KR) ......................... 10-2009-0135678
Dec. 24, 2010  (KR) ......................... 10-2010-0134899

(51) Int. Cl.

| | | |
|---|---|---|
| *C09D 133/14* | (2006.01) | |
| *B32B 27/30* | (2006.01) | |
| *C09D 4/00* | (2006.01) | |
| *C09D 127/12* | (2006.01) | |
| *C08G 83/00* | (2006.01) | |
| *C09D 133/10* | (2006.01) | |
| *C09D 133/08* | (2006.01) | |
| *C09D 201/00* | (2006.01) | |
| *C04B 14/00* | (2006.01) | |
| *C09D 133/00* | (2006.01) | |
| *G02B 1/14* | (2015.01) | |
| *G02B 1/04* | (2006.01) | |
| *C04B 14/04* | (2006.01) | |
| *C04B 14/30* | (2006.01) | |
| *C04B 14/28* | (2006.01) | |

(52) U.S. Cl.
CPC . *C09D 4/00* (2013.01); *C04B 14/00* (2013.01); *C08G 83/005* (2013.01); *C09D 127/12* (2013.01); *C09D 133/00* (2013.01); *C09D 133/08* (2013.01); *C09D 133/10* (2013.01); *C09D 201/005* (2013.01); *G02B 1/04* (2013.01); *G02B 1/14* (2015.01); *C01P 2004/64* (2013.01); *C04B 14/04* (2013.01); *C04B 14/28* (2013.01); *C04B 14/303* (2013.01); *C04B 14/305* (2013.01); *C08K 2201/005* (2013.01); *C08K 2201/011* (2013.01); *Y10T 428/273* (2015.01); *Y10T 428/2998* (2015.01)

(58) Field of Classification Search
CPC ............ C09D 201/005; C09D 133/00; C09D 133/08; C09D 133/10; C09D 127/12; C08G 83/005; Y10T 428/273; Y10T 428/2998; C04B 14/00; C04B 14/04; C04B 14/28; C04B 14/303; C04B 14/305; C08K 2201/011; C08K 2201/005; C01P 2004/64; G02B 1/04; G02B 1/14
See application file for complete search history.

(56) References Cited

U.S. PATENT DOCUMENTS

| | | | |
|---|---|---|---|
| 2006/0057307 A1* | 3/2006 | Matsunaga et al. | 428/1.31 |
| 2007/0231566 A1* | 10/2007 | Yoneyama et al. | 428/331 |
| 2008/0138606 A1* | 6/2008 | Yoshihara et al. | 428/327 |
| 2010/0330359 A1* | 12/2010 | Ishikawa et al. | 428/325 |

FOREIGN PATENT DOCUMENTS

| | | | | |
|---|---|---|---|---|
| JP | 2006-010829 | * | 1/2006 | |
| JP | 2006-028409 | * | 2/2006 | |
| KR | 10 2008-0062355 A | | 7/2008 | |
| KR | 10 2008-0070349 A | | 7/2008 | |
| KR | 10 2008-0078407 A | | 8/2008 | |
| KR | 10 2009-0028133 A | | 3/2009 | |
| KR | 2009-0028133 A | | 3/2009 | |
| KR | 10 2009-0039345 A | | 4/2009 | |
| WO | WO 2004/017105 | * | 2/2004 | |
| WO | WO-2004-017105 A1 | | 2/2004 | |
| WO | WO 2009041533 A1 | * | 4/2009 | .......... C09D 133/08 |

OTHER PUBLICATIONS

Machine translation of JP2006-028409. Retrieved Feb. 10, 2013.*
Machine KR1020080078407. Retrieved Feb. 10, 2013.*
International Search Report in PCT/KR2010/009530, dated Sep. 23, 2011 (Hwang, et al.).
Taiwanese Office Action in TW 099146884, dated May 23, 2013 (Hwang, et al.).
Korean Office Action in KR 10-2010-0134899, dated Aug. 26, 2013 (Hwang, et al.).
Office Action mailed Feb. 11, 2014 in corresponding Taiwanese Patent Application No. 099146884.

* cited by examiner

*Primary Examiner* — Prashant J Khatri
(74) *Attorney, Agent, or Firm* — Lee & Morse, P.C.

(57) ABSTRACT

A hard coating film that is curled to a height of less than 20 mm and has a pencil hardness of 3H or harder, the hard coating film including a hard coating agent that includes a hyperbranched (meth)acrylate oligomer having about 50 to about 200 (meth)acrylate groups, reactive nanoparticles, and a polyfunctional monomer.

20 Claims, No Drawings

HARD COATING FILM, HARD COATING AGENT, AND POLARIZING PLATE INCLUDING THE HARD COATING FILM

CROSS-REFERENCE TO RELATED APPLICATION

This application is a continuation of pending International Application No. PCT/KR2010/009530, entitled "Hard Coating Film," which was filed on Dec. 29, 2010, the entire contents of which are hereby incorporated by reference.

BACKGROUND

1. Field

Embodiments relates to a hard coating film, a hard coating agent, and a polarizer plate including the hard coating film.

2. Description of the Related Art

A polarizing film may include a film-like polarizer formed from a polymer, e.g., polyvinyl alcohol (PVA), and cellulose resin films, one of which is a base film, bonded to sides of the polarizer. The polarizing film may have a multilayer structure in which a protective film is adhered to one base film (to protect a surface of the base film from damage during transport), and a pressure-sensitive adhesive layer and a release film may be sequentially laminated on another resin or base film. Such polarizing films may be used as constituents of liquid crystal displays (LCDs).

For high durability of polarizing films under various environmental conditions, high-hardness hard coating products to modify the surface of the polarizing films have been considered.

SUMMARY

Embodiments are directed to a hard coating film, a hard coating agent, and a polarizer plate including the hard coating film.

The embodiments may be realized by providing a hard coating film that is curled to a height of less than 20 mm and has a pencil hardness of 3H or harder, the hard coating film comprising a hard coating agent including a hyperbranched (meth)acrylate oligomer having about 50 to about 200 (meth)acrylate groups, reactive nanoparticles, and a polyfunctional monomer.

The hyperbranched (meth)acrylate oligomer may be represented by Formula 1A:

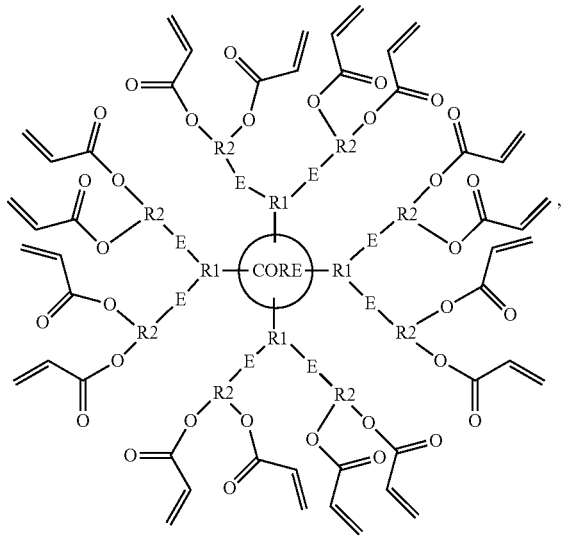

(1A)

and wherein the core is a $C_3$-$C_{50}$ aliphatic or aromatic hydrocarbon having functional groups bonded to R1 or a $C_3$-$C_{50}$ aliphatic or aromatic hydrocarbon having functional groups bonded to R1 and containing at least one heteroatom, R1 and R2 are each independently a $C_1$-$C_{50}$ aliphatic or aromatic hydrocarbon or a $C_1$-$C_{50}$ aliphatic or aromatic hydrocarbon containing at least one heteroatom, and E is an ester bond.

The reactive nanoparticles may have an average diameter of about 10 nm to about 100 nm.

The reactive nanoparticles may be inorganic nanoparticles surface-modified with a (meth)acrylate compound.

About 3 to about 50% of a surface area of the inorganic nanoparticles may be modified with the (meth)acrylate compound.

The inorganic nanoparticles may be selected from the group of nanoparticles of $SiO_2$, $Al_2O_3$, $CaCO_3$, $TiO_2$, and mixtures thereof.

The polyfunctional monomer may be selected from the group of a polyfunctional (meth)acrylate compound which may optionally comprise hydroxyl group; a fluorinated polyfunctional (meth)acrylate compound; and mixtures thereof.

The polyfunctional monomer may include the polyfunctional (meth)acrylate compound which may optionally comprise hydroxyl group, the polyfunctional (meth)acrylate compound including at least one of dipentaerythritol hexa(meth)acrylate, pentaerythritol tri(meth)acrylate, tri(2-hydroxyethyl)isocyanurate tri(meth)acrylate, trimethylolpropane tri(meth)acrylate, hexanediol di(meth)acrylate, pentaerythritol tetra(meth)acrylate, ditrimethylolpropane tetra(meth)acrylate, and dicyclodecane dimethanol di(meth)acrylate.

The polyfunctional monomer may include the fluorinated polyfunctional (meth)acrylate compound, the fluorinated polyfunctional (meth)acrylate compound being prepared by a reaction of a perfluoropolyether-containing compound and a polyfunctional (meth)acrylate compound.

The hard coating agent may include about 15 to about 60% by weight of the hyperbranched (meth)acrylate oligomer, about 5 to about 60% by weight of the reactive nanoparticles, and about 1 to about 40% by weight of the polyfunctional monomer.

The hard coating film may further include a reactive fluorinated compound.

The reactive fluorinated compound may be represented by Formula 3:

$$(CH_2=CR1COO)_2Rf \qquad (3),$$

wherein R1 is a hydrogen atom or a $C_1$-$C_3$ alkyl group and Rf is a perfluoroalkylene group represented by one of the following group (a) to group (e) of Formula (4):

(4)

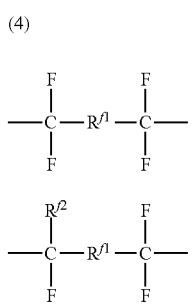

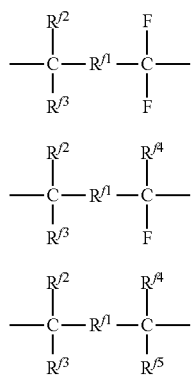

wherein each $R^{f1}$ is a $C_1$-$C_{10}$ straight or branched perfluoroalkylene group, and $R^{f2}$, $R^{f3}$, $R^{f4}$, and $R^{f5}$ are each independently a $C_1$-$C_{14}$ straight or branched perfluoroalkyl group.

The reactive fluorinated compound may be present in an amount of about 0.01 to about 5 parts by weight, based on 100 parts by weight of the hard coating agent.

The hard coating agent may further include one or more additives selected from the group of photopolymerization initiators, solvents, photosensitizers, polymerization inhibitors, leveling agents, wettability improvers, surfactants, plasticizers, UV absorbers, antioxidants, antistatic agents, silane coupling agents, inorganic fillers, and defoaming agents.

The hard coating film may be curled to a height of less than about 20 mm at a thickness of about 2 to about 30 μm.

The embodiments may also be realized by providing a hard coating agent including a hyperbranched (meth)acrylate oligomer; reactive nanoparticles; and a polyfunctional monomer, wherein a number of (meth)acrylate groups in the hyperbranched (meth)acrylate oligomer is about 50 to about 200.

The hyperbranched (meth)acrylate oligomer may be represented by Formula 1A:

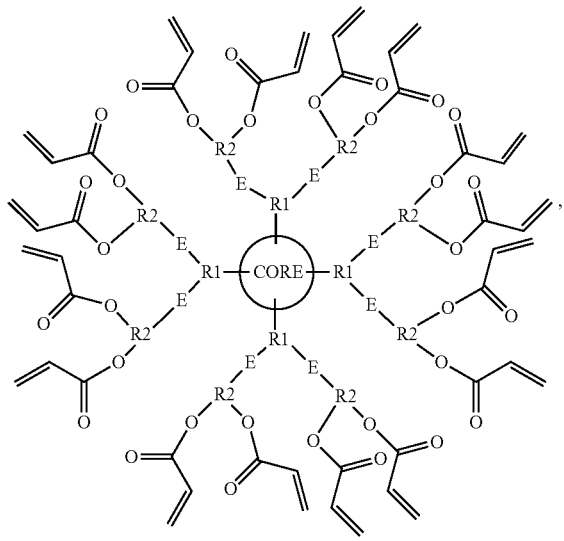

(1A)

and wherein the core is a $C_3$-$C_{50}$ aliphatic or aromatic hydrocarbon having functional groups bonded to R1 or a $C_3$-$C_{50}$ aliphatic or aromatic hydrocarbon having functional groups bonded to R1 and containing at least one heteroatom, R1 and R2 are each independently a $C_1$-$C_{50}$ aliphatic or aromatic hydrocarbon or a $C_1$-$C_{50}$ aliphatic or aromatic hydrocarbon containing at least one heteroatom, and E is an ester bond.

The hard coating agent may further include a reactive fluorinated compound.

The reactive fluorinated compound may be represented by Formula 3:

$$(CH_2=CR1COO)_2Rf \qquad (3),$$

wherein R1 is a hydrogen atom or a $C_1$-$C_3$ alkyl group and Rf is a perfluoroalkylene group having a structure one of the following group (a) to group (e) of Formula (4):

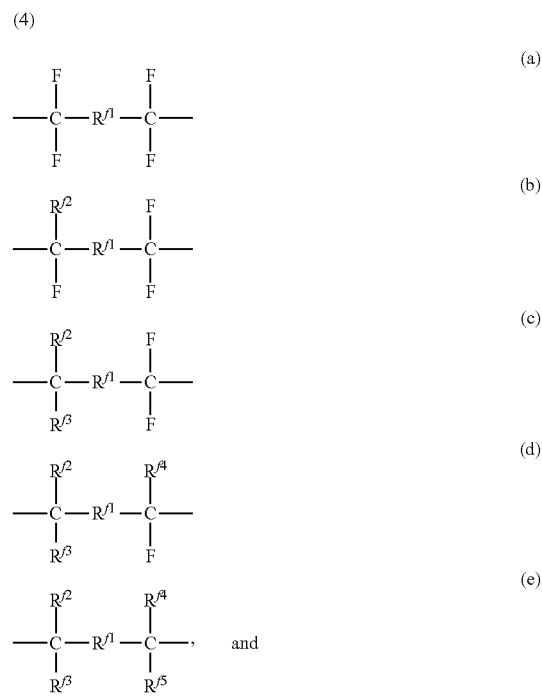

and
wherein each $R^{f1}$ is a $C_1$-$C_{10}$ straight or branched perfluoroalkylene group, and $R^{f2}$, $R^{f3}$, $R^{f4}$, and $R^{f5}$ are each independently a $C_1$-$C_{14}$ straight or branched perfluoroalkyl group.

The embodiments may also be realized by providing a polarizing plate comprising the hard coating film according to an embodiment.

DETAILED DESCRIPTION

Korean Patent Application No. 10-2009-0135678, filed on Dec. 31, 2009, and entitled, "Hard Coating Film," and Korean Patent Application No. 10-2010-0134899, filed on Dec. 24, 2010, and entitled, "Hard Coating Film," are incorporated by reference herein in their entireties.

It will be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present.

The embodiments provide a hard coating film that may be curled to a height of less than about 20 mm and that has a pencil hardness of 3H or harder.

The curling height may refer to a height from a bottom of the hard coating film (having a thickness of about 2 to about 30 μm) to a highest one of curved portions of the hard coating film. In an implementation, the hard coating film may be curled to a height of less than about 15 mm.

The pencil hardness of the hard coating film may be measured using a pencil hardness tester (Shinto Scientific, Heidon) after a line is drawn with a Mitsubishi pencil (UNI) on the hard coating film at a rate of 0.5 mm/sec under a load of 500 kg/cm$^2$. In an implementation, the hard coating film may have a pencil hardness of 4H.

The hard coating film may include a hard coating agent. The hard coating agent may include (a) a hyperbranched (meth)acrylate oligomer, (b) reactive nanoparticles, and (c) a polyfunctional monomer. In an implementation, the hyperbranched (meth)acrylate oligomer (a) may have, e.g., about 21 to about 200 (meth)acrylate groups.

Maintaining the number of (meth)acrylate groups in the hyperbranched (meth)acrylate oligomer at about 21 or greater may help ensure that an effective reduction in curling is obtained. Maintaining the number of (meth)acrylate groups in the hyperbranched (meth)acrylate oligomer at about 200 or less may help ensure that an effective reduction in curling is obtained and may help prevent a decrease in pencil hardness. In an implementation, the number of (meth)acrylate groups in the hyperbranched (meth)acrylate oligomer may be, e.g., about 50 to about 200 or about 50 to about 120.

Hereinafter, the respective components of the hard coating agent will be discussed in more detail.

(a) Hyperbranched (meth)acrylate Oligomer

The hyperbranched (meth)acrylate oligomer may have, e.g., about 21 to about 200 (meth)acrylate groups. In an implementation, the number of (meth)acrylate groups in the hyperbranched (meth)acrylate oligomer may be, e.g., about 50 to about 200 or about 50 to about 120.

As used herein, the term "(meth)acrylate" refers to both acrylate(-OCO—CH=CH$_2$) and methacrylate(-OCO—C(CH$_3$)=CH$_2$).

In an implementation, the hyperbranched (meth)acrylate oligomer may be represented by Formula 1:

$$X\text{-}(A)_n \quad \text{Formula 1}$$

wherein X is formula 1-1 below, A is (meth)acrylate, and n is about 21 to about 200.

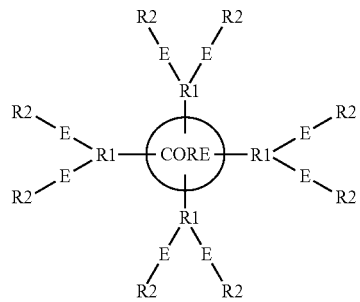

Formula 1-1

In Formula 1-1, the core may be a $C_3$-$C_{50}$ aliphatic or aromatic hydrocarbon having functional groups that may be bonded to R1. In an implementation, the $C_3$-$C_{50}$ aliphatic or aromatic hydrocarbon may contain at least one heteroatom. R1 and R2 may each independently be a $C_1$-$C_{50}$ aliphatic or aromatic hydrocarbon. In an implementation, the $C_1$-$C_{50}$ aliphatic or aromatic hydrocarbon may contain at least one heteroatom. E may be an ester bond.

In Formula 1, A is bonded to R2.

Preferably, n is about 50 to about 200.

In an implementation, the hyperbranched (meth)acrylate oligomer may be represented by Formula 1A, below

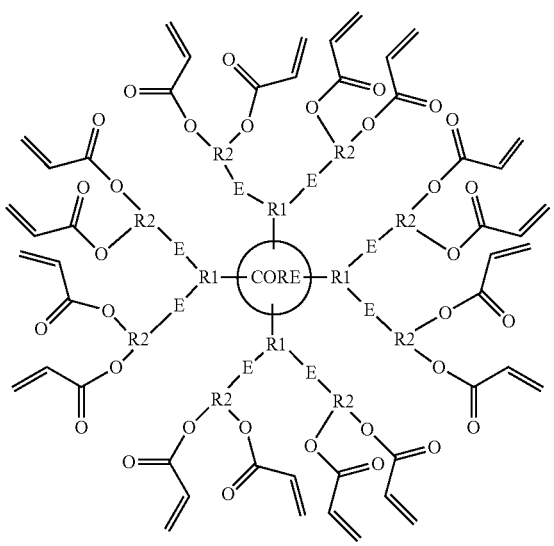

(1A)

In Formula 1A, the core may be a $C_3$-$C_{50}$ aliphatic or aromatic hydrocarbon having functional groups that may be bonded to R1. In an implementation, the $C_3$-$C_{50}$ aliphatic or aromatic hydrocarbon may contain at least one heteroatom. R1 and R2 may each independently be a $C_1$-$C_{50}$ aliphatic or aromatic hydrocarbon. In an implementation, the $C_1$-$C_{50}$ aliphatic or aromatic hydrocarbon may contain at least one heteroatom. E may be an ester bond.

In an implementation, the hyperbranched (meth)acrylate oligomer represented by Formula 1 may be represented by Formula 2:

$$X_1\text{-}(A)_n \quad \text{Formula 2}$$

wherein $X_1$ is formula 2-1 below, A is (meth)acrylate, n is about 21 to about 200.

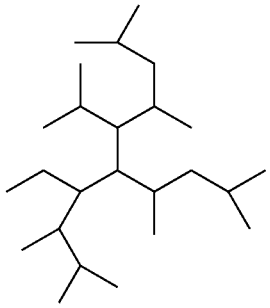

Formula 2-1

In Formula 2-1, the bold lines represent a hyperbranched structure of the core, R1, E and R2. As shown in Formula 2, the hyperbranched structure may be surrounded by the (meth)acrylate groups.

In an implementation, the hyperbranched (meth)acrylate oligomer represented by Formula 2 may be represented by Formula 2A:

Formula 2A

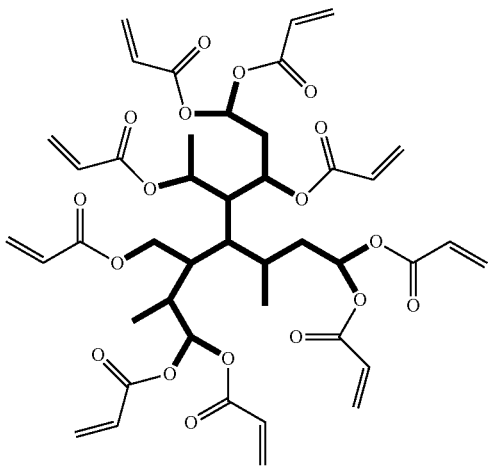

(2A)

In Formula 2A, the bold lines represent a hyperbranched structure of the core, R1, E and R2. As shown in Formula 2A, the hyperbranched structure may be surrounded by the (meth) acrylate groups.

The hyperbranched (meth)acrylate oligomer may be synthesized by any suitable method, e.g., a Diels-Alder reaction or ester condensation.

In an implementation, the hyperbranched (meth)acrylate oligomer may be synthesized by ester condensation of a trifunctional to hexafunctional hydroxyl group-containing monomer and a monomer having a carboxyl group and two hydroxyl groups to prepare a polyfunctional polyester polyol, and introducing a (meth)acrylic acid into the polyester polyol.

Examples of the trifunctional to hexafunctional hydroxyl group-containing monomers may include trimethylolpropane, pentaerythritol, and dipentaerythritol. The monomer having a carboxyl group and two hydroxyl groups may include, e.g., dimethylol propanoic acid, or dimethylol butanoic acid. The (meth)acrylic acid may include, e.g., acrylic acid or methacrylic acid.

The hyperbranched (meth)acrylate oligomer may be commercially available. For example, the hyperbranched (meth) acrylate oligomer may include UNIDIC V 6830 available from DIC Corporation.

The hyperbranched (meth)acrylate oligomer may have a weight average molecular weight of about 5,000 to about 10,000 g/mol. The hyperbranched (meth)acrylate oligomer may have a viscosity at 25° C. of about 100 to about 400 cps.

The hyperbranched (meth)acrylate oligomer may be included in the hard coating agent in an amount of, e.g., about 15 to about 60% by weight. Maintaining the amount of the hyperbranched (meth)acrylate oligomer within this range may help ensure that curling is reduced without any deterioration in pencil hardness. In an implementation, the hyperbranched (meth)acrylate oligomer may be included in an amount of about 20 to about 50% by weight or about 30 to about 45% by weight.

(b) Reactive Nanoparticles

The reactive nanoparticles may help increase surface hardness of the hard coating film. In an implementation, the reactive nanoparticles may include inorganic nanoparticles surface-modified with a (meth)acrylate compound.

The reactive nanoparticles may have uniform self-dispersibility, thus avoiding the need to use a dispersant and a coupling agent. The reactive nanoparticles may not scatter incident light and may be stably dispersible, which helps to reduce and/or prevent aggregation of the particles. As a result, the reactive nanoparticles may have high transparency and low turbidity.

About 3 to about 50% of a surface area of the reactive nanoparticles may be surface-modified with the (meth)acrylate compound. Within this range, uniform dispersibility and high transparency of the hard coating film may be ensured.

The reactive nanoparticles may include, e.g., organic nanoparticles, inorganic nanoparticles, or a combination thereof. In an implementation, the reactive nanoparticles may include, e.g., $SiO_2$ nanoparticles, $Al_2O_3$ nanoparticles, $CaCO_3$ nanoparticles, $TiO_2$ nanoparticles, or a mixture thereof.

The reactive nanoparticles may be prepared according to any suitable method. For example, the reactive nanoparticles surface-modified with a (meth)acrylate compound may be produced by reacting a silane coupling agent having one or more reactive acrylate groups (e.g., KBM503 available from Shin-Etsu) with a silica sol. The reactive nanoparticles surface-modified with a (meth)acrylate compound may also be commercially available. For example, the reactive nanoparticles may include Nanopol C784 available from Nano resins.

The reactive nanoparticles may have an average diameter of about 10 to about 100 nm. Within this range, an increase in turbidity of the hard coating film may be avoided, and deterioration in surface strength and scratch resistance of the hard coating film may be reduced and/or prevented.

The reactive nanoparticles may be included in the hard coating agent in an amount of, e.g., about 5 to about 60% by weight. Within this range, the hard coating film may have high surface hardness and good scratch resistance, may be less likely to curl, and may help reduce and/or prevent an increase in haze (turbidity). In an implementation, the reactive nanoparticles may be included in an amount of, e.g., about 10 to about 50% by weight or about 20 to about 45% by weight.

(c) Polyfunctional Monomer

Examples of suitable polyfunctional monomers may include polyfunctional (meth)acrylate compounds, and fluorinated polyfunctional (meth)acrylate compounds, and a mixture thereof. The polyfunctional (meth)acrylate compounds may optionally further comprise hydroxyl-group.

In an implementation, the polyfunctional (meth)acrylate compounds may include, e.g., dipentaerythritol hexa(meth) acrylate, pentaerythritol tri(meth)acrylate, tri(2-hydroxyethyl)isocyanurate tri(meth)acrylate, trimethylolpropane tri (meth)acrylate, hexanediol di(meth)acrylate, pentaerythritol tetraacrylate, ditrimethylolpropane tetraacrylate, and/or dicyclodecane dimethanol di(meth)acrylate. The polyfunctional (meth)acrylate compounds may optionally further comprise hydroxyl-group. The polyfunctional (meth)acrylate compounds may be used alone or as a mixture of two or more thereof.

The fluorinated polyfunctional (meth)acrylate compounds may include reaction products of perfluoropolyether-containing compounds and polyfunctional (meth)acrylate compounds. For example, the fluorinated polyfunctional (meth) acrylate compounds may include monomers having about 2 to about 16 functional groups. The fluorinated polyfunctional (meth)acrylate compounds may be prepared by reacting perfluoropolyether compounds having various functional groups (such as a perfluoropolyether polyol having hydroxyl groups, a perfluoropolyether dibasic acid having carboxyl groups, and/or a perfluoropolyether epoxy compound having epoxy groups) with polyfunctional (meth)acrylate compounds (such as the polyfunctional (meth)acrylate compound, a modified (meth)acrylate compound having a carboxyl group, a (meth)acrylate compound having an epoxy group, and/or a (meth)acrylate compound having an isocyanate group). The fluorinated polyfunctional (meth)acrylate compounds may be used alone or as a mixture of two or more thereof.

The polyfunctional monomer may be included in the hard coating agent in an amount of, e.g., about 1 to about 40% by weight. Within this range, the hard coating film may have high surface hardness and good scratch resistance, may be less likely to curl, and may help reduce and/or prevent an increase in haze (turbidity). In an implementation, the polyfunctional monomer may be included in an amount of, e.g., about 10 to about 30% by weight or about 15 to about 25% by weight.

In an implementation, in addition to the hyperbranched (meth)acrylate oligomer (a), the reactive nanoparticles (b) and the polyfunctional monomer (c), the hard coating film may further include a reactive fluorinated compound.

The reactive fluorinated compound may be a surfactant and may help improve scratch resistance of the film. The reactive fluorinated compound may include one or more functional groups, e.g., two or more functional or reactive groups.

Examples of suitable reactive fluorinated compounds may include monomers, oligomers, and prepolymers including di- or higher functional acrylate or (meth)acrylate compounds containing a fluorinated alkyl group. Examples of such polyfunctional acrylate or (meth)acrylate compounds may include a (meth)acrylate compound having an epoxy group, a (meth)acrylate compound having a carboxyl group, a (meth)acrylate compound having a hydroxyl group, a (meth)acrylate compound having an amino group, and a (meth)acrylate compound having a sulfonic acid group.

The reactive fluorinated compound may include a fluorinated polyfunctional (meth)acrylate compound prepared by reacting a perfluoropolyether-containing compound with a polyfunctional (meth)acrylate compound. In an implementation, the reactive fluorinated compound may include a monomer or oligomer having about 2 to about 16 functional groups prepared by reacting a perfluoropolyether compound (such as a perfluoropolyether polyol having hydroxyl groups, a perfluoropolyether dibasic acid having carboxyl groups, or a perfluoropolyether epoxy compound having epoxy groups), with a polyfunctional acrylate compound (such as a modified acrylate compound having a carboxyl group, an acrylate compound having an epoxy group, or an acrylate compound having an isocyanate group).

The reactive fluorinated compound may include a compound represented by Formula 3, below.

(CH$_2$=CR1COO)$_2$Rf  (3)

In Formula 3, R1 may be a hydrogen atom or a C1-C3 alkyl group, and Rf may be a perfluoroalkylene group.

In an implementation, Rf in Formula 3 may have a structure represented by group (a) to group (e) of the following Formula (4).

(4)

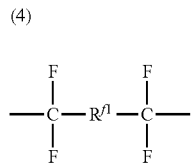

(a)

-continued

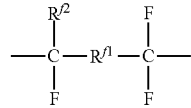

(b)

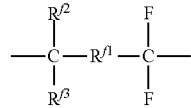

(c)

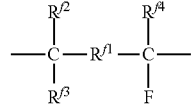

(d)

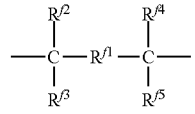

(e)

In groups (a)-(e) of Formula 4, each $R^{f1}$ may be a $C_1$-$C_{10}$ straight or branched perfluoroalkylene group, and $R^{f2}$, $R^{f3}$, $R^{f4}$, and $R^{f5}$ may each independently be a $C_1$-$C_{14}$ straight or branched perfluoroalkyl group.

The reactive fluorinated compound may be included in an amount of about 0.01 to about 5 parts by weight, based on a total solids content (100 parts by weight) of the hard coating agent. Within this range, scratch resistance of the hard coating film may be improved. In an implementation, the reactive fluorinated compound may be included in an amount of about 0.1 to about 3 parts by weight.

The hard coating agent may further include a suitable UV curable resin. In an implementation, the UV curable resin may include a resin having (meth)acrylate groups, e.g., a polyester resin, polyether resins, acrylic resins, epoxy resins, urethane resins, alkyd resins, spiroacetal resins, polybutadiene resins, polythiolpolyene resins, and/or (meth)acrylate resins of polyfunctional compounds (e.g., polyhydric alcohols), which have a relatively low weight average molecular weight (Mw) (e.g., about 100-1,000).

The hard coating agent may further include one or more suitable additives. Examples of such additives may include photopolymerization initiators, solvents, photosensitizers, polymerization inhibitors, leveling agents, wettability improvers, surfactants, plasticizers, UV absorbers, antioxidants, antistatic agents, silane coupling agents, inorganic fillers, and defoaming agents. The additives may be used alone or as a mixture of two or more thereof.

Examples of the photopolymerization initiators may include benzophenone compounds, such as 1-hydroxycyclohexyl phenyl ketone.

Solvents capable of dissolving or swelling components of the hard coating agent may be applied to a base film. Examples of the solvents may include ketones, such as methyl ethyl ketone, cyclohexanone, acetone, diacetone alcohol and polyhydric alcohols; ethers, such as methyl cellosolve, ethyl cellosolve, butyl cellosolve and cellosolve acetate; esters, such as methyl acetate and ethyl acetate; halogenated hydrocarbons, such as chloroform, methylene chloride and tetrachloroethane; nitrogenous compounds, such as nitromethane, acetonitrile, N-methylpyrrolidone and N,N-dimethylformamide; and dimethyl sulfoxide. The solvents may be used alone or as a mixture of two or more thereof.

The hard coating film may be formed by any suitable method. In an implementation, the hard coating film may be formed by applying the hard coating agent to a base film, and drying and UV curing the hard coating agent. The drying and UV curing conditions are not particularly limited.

In an implementation, the hard coating film may be curled to a height of less than about 20 mm at a thickness of about 2 to about 30 μm. In an implementation, the hard coating film may be curled to a height of less than about 15 mm.

In an implementation, the hard coating film may have a pencil hardness of 3H or harder, e.g., 4H or harder.

The hard coating film may have a thickness of, e.g., about 2 μm to about 30 μm or about 10 μm to about 20 μm. Within this range, the hard coating film may have high hardness without being significantly curled while reducing the likelihood and/or preventing a rainbow phenomenon or interference pattern.

The polarizing plate according to an embodiment may include the hard coating film. The hard coating film may be the hard coating film according to an embodiment.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

EXAMPLES

The following components were used in Example 1 and Comparative Examples 1-5.

(a) Hyperbranched (meth)acrylate oligomer: UNIDIC V 6830 available from DIC Corporation, the number of (meth)acrylate groups=100

(a') Urethane acrylate resin: RC27-947 available from DIC Corporation, not hyperbranched in structure (b) Reactive nanoparticles: Nanopol C784 available from Nano resins (c) Polyfunctional monomer: Dipentaerythritol hexaacrylate (DPHA) available from SK Cytec Example 1

In accordance with the compositions shown in Table 1, below, the components were dispersed with stirring at 25° C. for 25 min. To the dispersion, Irgacure-184 (Ciba) as a photopolymerization initiator was added in an amount of 3 phr based on the solids content. The mixture was stirred at 25° C. for 10 min to prepare a hard coating agent.

The hard coating agent was coated to a thickness of 12-13 μm on a TAC film (thickness: 80 μm, Fuji) by using a #16 Meyer bar coater, dried at 80° C. for 2 min, and cured by irradiation with UV light having an energy of 350 mJ/cm$^2$ under a high-pressure mercury lamp to form a hard coating layer.

The resulting film was tested for pencil hardness, curling, scratch resistance, and rainbow or interference pattern by the JIS standard methods. The results are shown in Table 1.

Comparative Examples 1-5

The procedure of Example 1 was repeated except that the compositions were changed as shown in Table 1. The results are shown in Table 1.

Evaluation of Physical Properties (1) Pencil hardness: After a line was drawn with a Mitsubishi pencil (UNI) on each of the hard coating films produced in Example 1 and Comparative Examples 1-5 at a rate of 0.5 mm/sec under a load of 500 kg/cm$^2$, the pencil strength of the hard coating film was measured using a pencil hardness tester (Shinto Scientific, Heidon).

(2) Curling: After the hard coating film was cut into a sample having a size of 100 mm×100 mm, a height from the bottom of the sample to a highest one of the four corners of the sample was measured at 25° C. The hard coating film was judged to be 'good' when it was curled to a height of less than 20 mm, 'poor' when it was curled to a height greater than 20 mm but not greater than 40 mm, and 'very poor' when it was curled to a height greater than 40 mm.

(3) Scratch resistance: After steel wool (#0000) was reciprocated ten times on the hard coating film at a rate of 50 mm/sec under a load of 1,000 kg/cm$^2$, the formation of scratches on the hard coating film was confirmed using a scratch resistance tester (Shinto Scientific, Heidon).

(4) Rainbow (interference pattern): After a black tape was attached to a side opposed to the hard coating layer in order to prevent back-side reflection, the occurrence of a rainbow or interference pattern on the surface of the hard coating layer was visually observed under a triple wavelength fluorescent lamp. The hard coating film was scored based on the following criteria:

1: No rainbow occurred in all directions
2: Slight rainbow occurred
3: Strong rainbow occurred

TABLE 1

|  | Example 1 | Comparative Examples |  |  |  |  |
|---|---|---|---|---|---|---|
|  |  | 1 | 2 | 3 | 4 | 5 |
| (a) Hyperbranched (meth)acrylate | 40 | 100 | 60 | 60 | — | — |
| (a') Urethane acrylate | — | — | — | — | 100 | 50 |
| (b) Reactive nanoparticles | 40 | — | 40 | — | — | 35 |
| (c) Polyfunctional monomer | 20 | — | — | 40 | — | 15 |
| Pencil hardness | 4H | 2H | 2H | 2H | 2H | 3H |
| Curling (height, mm) | Good, 14 | Good, 0 | Good, 6 | Poor, 22 | Not measured | Very poor, 40 |
| Scratch resistance | ○ | ○ | ○ | ○ | ○ | ○ |
| Rainbow | 1 | 1 | 1 | 1 | 1 | 1 |

As may be seen in Table 1, the hard coating film of Example 1 had higher pencil hardness and was less likely to curl than the hard coating films of Comparative Examples 1-5.

By way of summation and review, a pencil hardness as hard as 3H for high-hardness polarizing films may require a coating thickness of greater than 10 μm. However, an increase in coating thickness may cause severe curling of the coating, leading to breakage of the polarizing films.

For example, hard coating agents may include an acrylic polymer, a urethane polymer, an epoxy polymer, a silicone polymer, or a silica compound as a component. The component may be present in a monomeric or oligomeric form. Addition of a photoinitiator and heating or UV irradiation may polymerize the monomeric or oligomeric component to form a hard coating layer. Wear resistance of the coating layer or agents may improve with increasing cross-linking density.

However, the coating layer may be curved or may crack during transport owing to its shrinkage, and a coating connection may deform. As a result, the coating layer may be peeled off even when it is brought into light contact with materials, owing to poor adhesion therebetween. Curling may be more serious as a thickness of a base decreases. Curling and discoloration may result from thermal processing.

The embodiments provide hard coating films that are less likely to curl even at a thickness of 10 μm or above while maintaining a pencil hardness of 3H or harder, that have good scratch resistance, and that can reduce and/or prevent occurrence of a rainbow phenomenon or interference pattern.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A hard coating film that is curled to a height of less than 20 mm and has a pencil hardness of 3H or harder, the hard coating film comprising a hard coating agent including:
   a hyperbranched (meth)acrylate oligomer having about 50 to about 200 (meth)acrylate groups,
   reactive nanoparticles, the reactive nanoparticles being inorganic nanoparticles surface modified with a (meth)acrylate compound, about 3 to about 50% of a surface area of the inorganic nanoparticles being modified with the (meth)acrylate compound, and
   a polyfunctional monomer.

2. The hard coating film as claimed in claim 1, wherein the hyperbranched (meth)acrylate oligomer is represented by Formula 1:

[Formula 1]

$$X—(A)_n$$

wherein, in Formula 1, X is represented by Formula 1-1 below, A is (meth)acrylate, and n is about 50 to about 200,

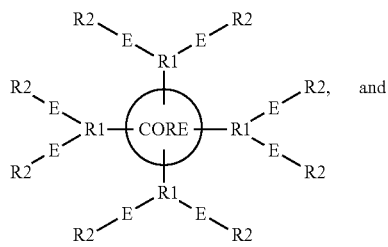

[Formula 1-1]

wherein, in Formula 1-1:
the core is a $C_3$-$C_{50}$ aliphatic or aromatic hydrocarbon having functional groups bonded to R1 or a $C_3$-$C_{50}$ aliphatic or aromatic hydrocarbon having functional groups bonded to R1 and containing at least one heteroatom, R1 and R2 are each independently a $C_1$-$C_{50}$ aliphatic or aromatic hydrocarbon or a $C_1$-$C_{50}$ aliphatic or aromatic hydrocarbon containing at least one heteroatom, and E is an ester bond.

3. The hard coating film as claimed in claim 1, wherein the reactive nanoparticles have an average diameter of about 10 nm to about 100 nm.

4. The hard coating film as claimed in claim 1, wherein the inorganic nanoparticles are selected from the group of nanoparticles of $SiO_2$, $Al_2O_3$, $CaCO_3$, $TiO_2$, and mixtures thereof.

5. The hard coating film as claimed in claim 1, wherein the polyfunctional monomer is selected from the group of a polyfunctional (meth)acrylate compound which may optionally further comprise hydroxyl group; a fluorinated polyfunctional (meth)acrylate compound; and mixtures thereof.

6. The hard coating film as claimed in claim 5, wherein the polyfunctional monomer includes the polyfunctional (meth)acrylate compound which may optionally further comprise hydroxyl group, the polyfunctional (meth)acrylate compound including at least one of dipentaerythritol hexa(meth)acrylate, pentaerythritol tri(meth)acrylate, tri(2-hydroxyethyl)isocyanurate tri(meth)acrylate, trimethylolpropane tri(meth)acrylate, hexanediol di(meth)acrylate, pentaerythritol tetra(meth)acrylate, ditrimethylolpropane tetra(meth)acrylate, and dicyclodecane dimethanol di(meth)acrylate.

7. The hard coating film as claimed in claim 5, wherein the polyfunctional monomer includes the fluorinated polyfunctional (meth)acrylate compound, the fluorinated polyfunctional (meth)acrylate compound being prepared by a reaction of a perfluoropolyether-containing compound and a polyfunctional (meth)acrylate compound.

8. The hard coating film as claimed in claim 1, wherein the hard coating agent includes:
   about 15 to about 60% by weight of the hyperbranched (meth)acrylate oligomer,
   about 5 to about 60% by weight of the reactive nanoparticles, and
   about 1 to about 40% by weight of the polyfunctional monomer.

9. The hard coating film as claimed in claim 8, wherein the hard coating agent includes:
   15 to 40% by weight of the hyperbranched (meth)acrylate oligomer,
   5 to 60% by weight of the reactive nanoparticles, and
   1 to 25% by weight of the polyfunctional monomer.

10. The hard coating film as claimed in claim 1, further comprising a reactive fluorinated compound.

11. The hard coating film as claimed in claim 10, wherein the reactive fluorinated compound is represented by Formula 3:

$$(CH_2=CR1COO)_2Rf \qquad (3),$$

wherein R1 is a hydrogen atom or a $C_1$-$C_3$ alkyl group and Rf is a perfluoroalkylene group represented by one of the following group (a) to group (e) of Formula (4):

(4)

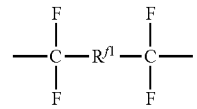

(a)

-continued

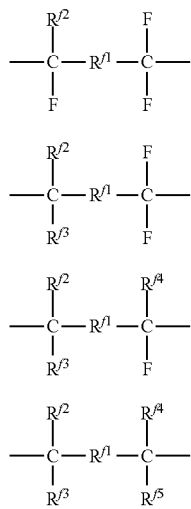

wherein:
each $R^{f1}$ is a $C_1$-$C_{10}$ straight or branched perfluoroalkylene group, and
$R^{f2}$, $R^{f3}$, $R^{f4}$, and $R^{f5}$ are each independently a $C_1$-$C_{14}$ straight or branched perfluoroalkyl group.

12. The hard coating film as claimed in claim 10, wherein the reactive fluorinated compound is present in an amount of about 0.01 to about 5 parts by weight, based on 100 parts by weight of the hard coating agent.

13. The hard coating film as claimed in claim 1, wherein the hard coating agent further includes one or more additives selected from the group of photopolymerization initiators, solvents, photosensitizers, polymerization inhibitors, leveling agents, wettability improvers, surfactants, plasticizers, UV absorbers, antioxidants, antistatic agents, silane coupling agents, inorganic fillers, and defoaming agents.

14. The hard coating film as claimed in claim 1, wherein the hard coating film is curled to a height of less than about 20 mm at a thickness of about 2 to about 30 μm.

15. A polarizing plate comprising the hard coating film as claimed in claim 1.

16. A hard coating agent, comprising:
a hyperbranched (meth)acrylate oligomer;
reactive nanoparticles, the reactive nanoparticles being inorganic nanoparticles surface modified with a (meth)acrylate compound, about 3 to about 50% of a surface area of the inorganic nanoparticles being modified with the (meth)acrylate compound; and
a polyfunctional monomer,
wherein a number of (meth)acrylate groups in the hyperbranched (meth)acrylate oligomer is about 50 to about 200.

17. The hard coating agent as claimed in claim 16, wherein the hyperbranched (meth)acrylate oligomer is represented by Formula 1:

[Formula 1]

$$X\text{—}(A)_n$$

wherein, in Formula 1, X is represented by Formula 1-1 below, A is (meth)acrylate, and n is about 50 to about 200,

[Formula 1-1]

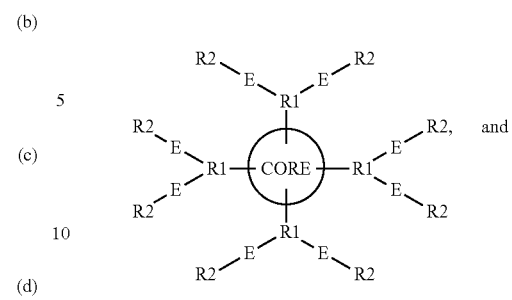

wherein, in Formula 1-1:
the core is a $C_3$-$C_{50}$ aliphatic or aromatic hydrocarbon having functional groups bonded to R1 or a $C_3$-$C_{50}$ aliphatic or aromatic hydrocarbon having functional groups bonded to R1 and containing at least one heteroatom,
R1 and R2 are each independently a $C_1$-$C_{50}$ aliphatic or aromatic hydrocarbon or a $C_1$-$C_{50}$ aliphatic or aromatic hydrocarbon containing at least one heteroatom, and
E is an ester bond.

18. The hard coating agent as claimed in claim 16, further comprising a reactive fluorinated compound.

19. The hard coating agent as claimed in claim 18, wherein the reactive fluorinated compound is represented by Formula 3:

$$(CH_2\text{=}CR1COO)_2Rf \quad (3),$$

wherein R1 is a hydrogen atom or a $C_1$-$C_3$ alkyl group and Rf is a perfluoroalkylene group having a structure one of the following group (a) to group (e) of Formula (4):

(4)

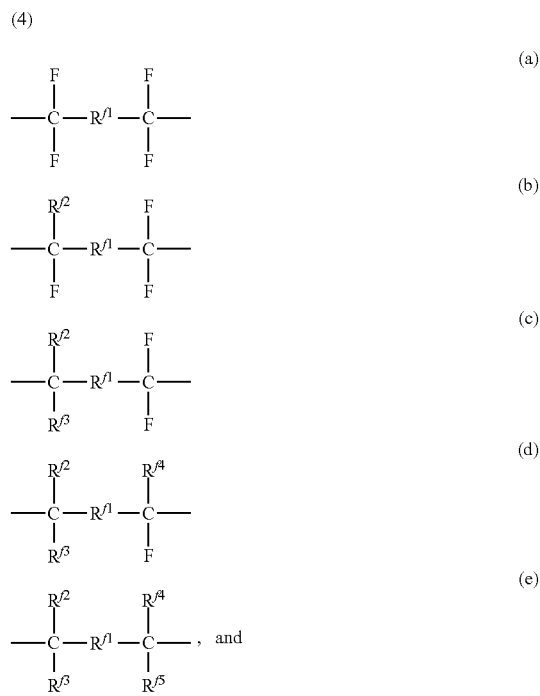

wherein:
each $R^{f1}$ is a $C_1$-$C_{10}$ straight or branched perfluoroalkylene group, and
$R^{f2}$, $R^{f3}$, $R^{f4}$, and $R^{f5}$ are each independently a $C_1$-$C_{14}$ straight or branched perfluoroalkyl group.

20. The hard coating agent as claimed in claim 16, wherein the hard coating agent includes:
- 15 to 40% by weight of the hyperbranched (meth)acrylate oligomer,
- 5 to 60% by weight of the reactive nanoparticles, and
- 1 to 25% by weight of the polyfunctional monomer.

\* \* \* \* \*